US012155986B2

(12) United States Patent
Jeong et al.

(10) Patent No.: US 12,155,986 B2
(45) Date of Patent: Nov. 26, 2024

(54) ACOUSTIC DEVICE AND ELECTRONIC DEVICE INCLUDING THE SAME

(71) Applicant: Samsung Electronics Co., Ltd., Suwon-si (KR)

(72) Inventors: Hyeonyeong Jeong, Suwon-si (KR); Haekeu Park, Suwon-si (KR); Sungjin Kim, Suwon-si (KR); Sohee Kim, Suwon-si (KR); Juhee Chang, Suwon-si (KR); Seunga Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 17/896,656

(22) Filed: Aug. 26, 2022

(65) Prior Publication Data

US 2023/0188885 A1 Jun. 15, 2023

Related U.S. Application Data

(63) Continuation of application No. PCT/KR2022/011302, filed on Aug. 1, 2022.

(30) Foreign Application Priority Data

Dec. 13, 2021 (KR) .......................... 1020210177422
Jan. 3, 2022 (KR) .......................... 1020220000148

(51) Int. Cl.
*H04R 1/10* (2006.01)
*H04R 1/08* (2006.01)

(52) U.S. Cl.
CPC ............ *H04R 1/1041* (2013.01); *H04R 1/08* (2013.01); *H04R 1/1016* (2013.01);
(Continued)

(58) Field of Classification Search
CPC ...... H04R 1/1041; H04R 1/08; H04R 1/1016; H04R 1/1075; H04R 2420/07; H04R 2400/11
See application file for complete search history.

(56) References Cited

U.S. PATENT DOCUMENTS 11,197,080 B2 12/2021 Liu
11,240,585 B2 2/2022 Terlizzi et al.
(Continued)

FOREIGN PATENT DOCUMENTS

KR 10-2011-0064763 A 6/2011
KR 10-1124013 B1 3/2012
(Continued)

OTHER PUBLICATIONS

International Search Report dated Nov. 4, 2022, issued in an International Application No. PCT/KR2022/011302.

*Primary Examiner* — Andrew Sniezek
(74) *Attorney, Agent, or Firm* — Jefferson IP Law, LLP

(57) ABSTRACT

An acoustic device and an electronic device including the same are provided. The acoustic device and an electronic device include a main body including at least one acoustic output port and at least one air vent port, a speaker unit accommodated in the main body, a first ear tip including at least one first opening area corresponding to the at least one air vent port and detachably coupled to the main body, and a second ear tip including at least one second opening area corresponding to the at least one air vent port and detachably coupled to the main body, wherein one of the first ear tip or the second ear tip may be coupled to the main body so that the main body is worn in a user's ear, and when the first ear tip is mounted, a larger area of the at least one air vent port may be exposed to an external space through the at least one first opening area than when the second ear tip is mounted.

19 Claims, 12 Drawing Sheets

(52) U.S. Cl.
CPC ....... *H04R 1/1075* (2013.01); *H04R 2420/07* (2013.01); *H04R 2460/11* (2013.01)

(56) References Cited

U.S. PATENT DOCUMENTS

| | | | | |
|---|---|---|---|---|
| 2010/0008528 | A1 | 1/2010 | Isvan | |
| 2011/0135136 | A1 | 6/2011 | Kim et al. | |
| 2017/0311073 | A1 | 10/2017 | Kang et al. | |
| 2018/0091890 | A1 | 3/2018 | Kuwahara et al. | |
| 2018/0184192 | A1 | 6/2018 | Na et al. | |
| 2018/0295439 | A1 | 10/2018 | Garrett | |
| 2018/0295455 | A1* | 10/2018 | Eichfeld .............. | H04R 25/652 |
| 2020/0314522 | A1 | 10/2020 | Vanblon et al. | |
| 2020/0382856 | A1* | 12/2020 | Liu ...................... | H04R 1/1075 |

FOREIGN PATENT DOCUMENTS

| | | | |
|---|---|---|---|
| KR | 10-2016-0049758 | A | 5/2016 |
| KR | 10-2017-0119922 | A | 10/2017 |
| KR | 10-1851740 | B1 | 4/2018 |

* cited by examiner

ACOUSTIC DEVICE AND ELECTRONIC DEVICE INCLUDING THE SAME

CROSS-REFERENCE TO RELATED APPLICATION(S)

This application is a continuation application, claiming priority under § 365(c), of an International application No. PCT/KR2022/011302, filed on Aug. 1, 2022, which is based on and claims the benefit of a Korean patent application number 10-2021-0177422, filed on Dec. 13, 2021, in the Korean Intellectual Property Office, and of a Korean patent application number 10-2022-0000148, filed on Jan. 3, 2022, in the Korean Intellectual Property Office, the disclosure of each of which is incorporated by reference herein in its entirety.

TECHNICAL FIELD

The disclosure relates to an electronic device. More particularly, the disclosure relates to an acoustic device and/or an electronic device including the acoustic device.

BACKGROUND ART

As electronic, information, and communication technologies have developed, various functions have come to be included into a single electronic device. For example, an electronic device (e.g., a smartphone) includes functions of an audio player, an imaging device, or a digital diary, in addition to a communication function, and various additional functions may be implemented in the smartphone through additional installation of applications. An electronic device may be provided with various pieces of information in real time by accessing a server or another electronic device in a wired or wireless manner as well as by executing an installed application or a stored function.

As the use of electronic devices becomes commonplace, user demands for portability and usability of electronic devices may increase. In response to such user demands, electronic devices capable of being carried and used in the state of being worn in a user's body (hereinafter, referred to as "wearable electronic devices") like a wrist watch or glasses have been commercialized. Prior to wrist watch-type or glasses-type electronic devices, electronic devices, such as earphones or hands-free sets, for example, acoustic devices, have provided an environment in which other electronic devices, such as smartphones can be used more conveniently. As short-range wireless communication, such as Bluetooth has become common, an electronic device, such as an earphone or a hands-free set may transmit/receive an acoustic signal through wireless communication with another electronic device in the state of being worn in a user's body (e.g., ear).

As the use of an acoustic device, such as an earphone or a hands-free set or an electronic device including the same has become common, users are capable of conveniently enjoying music, video or streaming sound/images even on the go. As the technology related to these acoustic devices has been further developed, acoustic devices, such as earphones have come to provide a function of attenuating or removing external sound or noise other than the output sound, and have come to be able to collect a user's voice or external sound or provide a voice control function.

The above-described information is presented as background only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Acoustic devices (e.g., earphones) worn in a user's ear are classified into an open type and a canal type depending on a method worn in an auditory canal or a degree of sealing in a state positioned in the auditory canal. A canal-type acoustic device may be disposed in the inner side of the ear canal compared to an open-type acoustic device and has a higher degree of sealing, so that it is possible to more effectively block external sound in the state of being worn in a user's ear. According to taste or actual use environment, a user may select and use an open-type acoustic device or a canal-type acoustic device. For example, when a user wants an environment where he or she can be immersed in output sound while moving in a public place, the user may use a canal-type acoustic device capable of suppressing external sound. The open-type acoustic device may provide a more comfortable fit than the canal-type acoustic device, and may provide an environment in which external sound or the voice of a nearby person is more easily recognizable compared to the canal-type acoustic device while listening to output sound.

However, when a user has purchased one of an open-type acoustic device or a canal-type acoustic device, additionally purchasing another type of acoustic device may increase an economic burden on the user. For example, when a user wants to use an acoustic device suitable for a usage environment, it is necessary for the user to purchase each of an open-type acoustic device and a canal-type acoustic device, which may cause an economic burden of purchasing and inconvenience of portability to the user. When a user owns either an open-type acoustic device or a canal-type acoustic device due to economic reasons or inconvenience of portability, even if the actual use environment is changed or the demand for wearing comfort is varied, it may difficult for the user to secure acoustic characteristics or fit of an acoustic device that the user does not own.

Aspects of the disclosure are to address at least the above-mentioned problems and/or disadvantages and to provide at least the advantages described below. Accordingly, an aspect of the disclosure is to provide an acoustic device that is capable of being used while switching the acoustic device between an open type and a canal type and/or an electronic device including the same.

Another aspect of the disclosure is to provide an acoustic device that is capable of providing acoustic characteristics suitable for a switched state even in the state of being switched into the open type or the canal type and/or an electronic device including the acoustic device.

Additional aspects will be set forth in part in the description which follows and, in part, will be apparent from the description, or may be learned by practice of the presented embodiments.

Technical Solution

In accordance with an aspect of the disclosure, an acoustic device is provided. The acoustic device includes a main body including at least one acoustic output port and at least one air vent port, a speaker unit accommodated in the main body, a first ear tip including at least one first opening area corresponding to the at least one air vent port and detachably coupled to the main body, and a second ear tip including at least one second opening area corresponding to the at least one air vent port and detachably coupled to the main body, wherein one of the first ear tip and the second ear tip may be coupled to the main body so that the main body is worn in a user's ear, and when the first ear tip is mounted, a larger area of the at least one air vent port may be exposed to an external space through the at least one first opening area than when the second ear tip is mounted.

In accordance with another aspect of the disclosure, an electronic device is provided. The electronic device includes a main body including at least one acoustic output port and at least one air vent port, a speaker unit accommodated in the main body, at least one processor accommodated in the main body, a communication module accommodated in the main body, a first ear tip including at least one first opening area corresponding to the at least one air vent port and detachably coupled to the main body, and a second ear tip including at least one second opening area corresponding to the at least one air vent port and detachably coupled to the main body, wherein one of the first ear tip and the second ear tip may be coupled to the main body so that the main body is worn in a user's ear, and wherein the at least one processor may configured to identify at least one of the first ear tip or the second ear tip coupled to the main body, control the speaker unit based on an ear tip identified from among the first ear tip or the second ear tip, and transmit information about the control of the speaker unit to an external electronic device by using the communication module.

Advantageous Effects

According to various embodiments of the disclosure, an acoustic device (or an electronic device including the same) includes an ear tip(s) corresponding to an open type or a canal type. Thus, it is possible for a user to switch the acoustic device into an open type or a canal type according to the user's desired acoustic characteristics or fit and use the acoustic device in the switched state. For example, since a single acoustic device is switchable between an open type and a canal type, it is possible to satisfy various demands of users while reducing the economic burden on the users. In some embodiments of the disclosure, since the output of the acoustic device is adjustable depending on the selection of an ear tip, it is possible to provide acoustic characteristics suitable for an open type or a canal type. In addition, various effects recognized directly or indirectly through this document may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description made with reference to the appended drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and configurations may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

Figure 1:
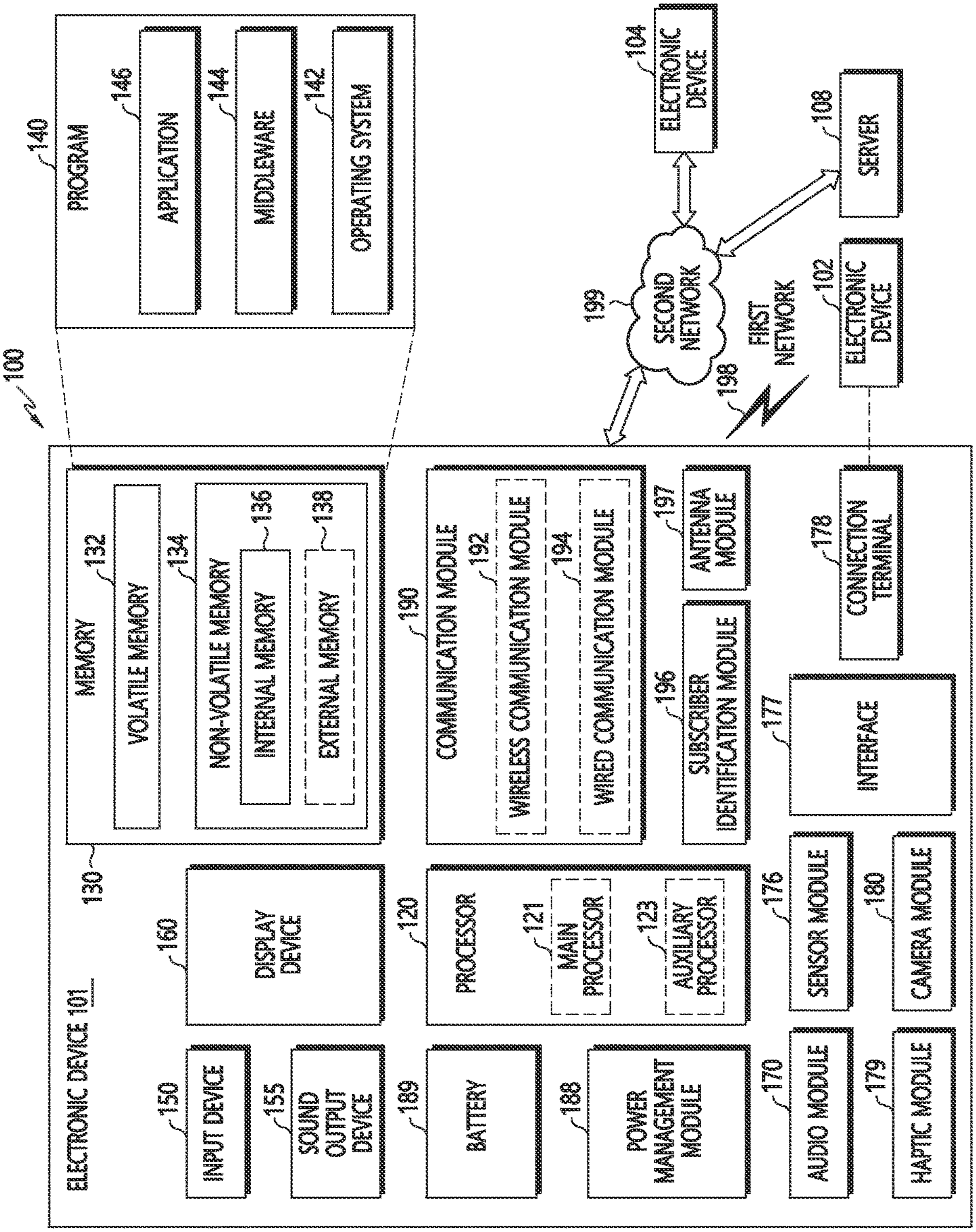
FIG. 1 is a block diagram illustrating an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program) including one or more instructions that are stored in a storage medium (e.g., an internal memory or an external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
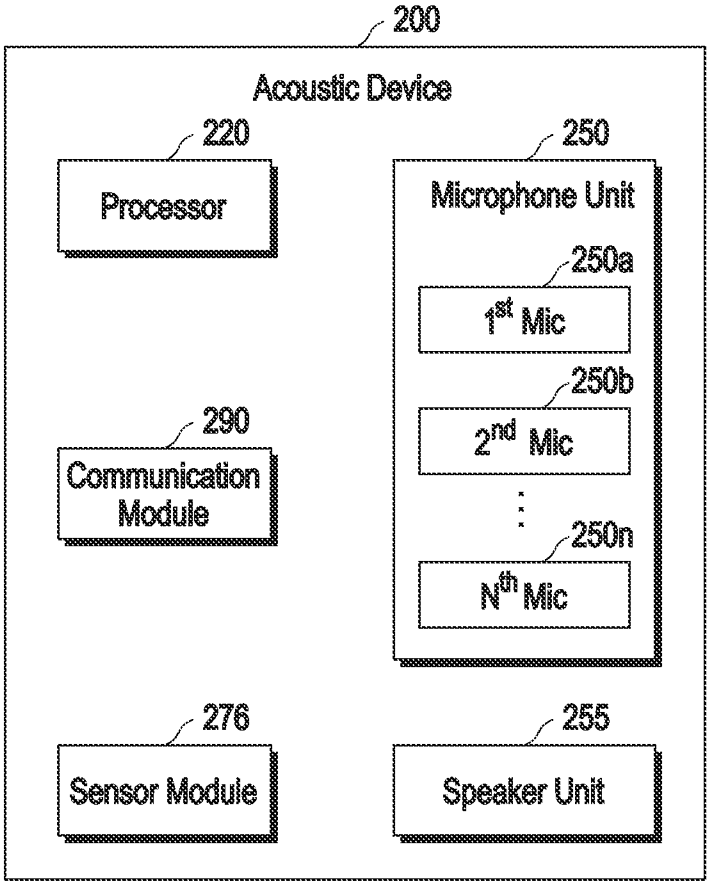
FIG. 2 is a block diagram illustrating an acoustic device according to an embodiment of the disclosure.

FIG. 2 is a block diagram illustrating an acoustic device according to an embodiment of the disclosure.

Referring to FIG. 2, an acoustic device 200 may be a part or the entirety of the electronic device 101 of FIG. 1. For example, the processor 220 (e.g., the processor 120 in FIG. 1) may perform wireless communication with external electronic devices (e.g., the electronic devices 102 and 104 in FIG. 1), such as a smartphone, a tablet PC, or a personal computer via a first network (e.g., the first network 198 in FIG. 1) or a second network (e.g., the second network 199 in FIG. 1) by using a communication module 290 (e.g., the communication module 190 in FIG. 1). In describing the acoustic device 200 of FIG. 2, a detailed description of components similar to those of the embodiment of FIG. 1 or easily understood through the embodiment of FIG. 1 may be omitted. For example, although omitted in FIG. 2, the acoustic device 200 may include the memory 130, the battery 189, the power management module 188, the audio module 170, the interface 177, and/or the connection terminal 178 of FIG. 1.

Referring to FIG. 2, the acoustic device 200 may include a processor 220, a communication module 290, a sensor module 276, a microphone unit 250, and/or a speaker unit 255. As will be described with reference to FIG. 3, the acoustic device 200 (e.g., the acoustic device 300 in FIG. 3) may include a main body (e.g., the main body 301 in FIG. 3) and a plurality of (e.g., at least two) ear tips (e.g., the ear tips 302 and 303 in FIG. 3), and the component(s) described with reference to FIG. 2 may be substantially accommodated in the main body 301 of FIG. 3. According to one embodiment of the disclosure, the processor 220 may control at least one other component connected thereto by executing software (e.g., the program 140 in FIG. 1), and may perform wireless communication with external electronic devices (e.g., the electronic devices 102 and 104 in FIG. 1) by using the communication module 290 (e.g., the communication module 190 in FIG. 1). According to an embodiment of the disclosure, information about user settings set in an external electronic device may be received via the communication module 290, and the processor 220 may control the acoustic device 200 (e.g., the speaker unit 255) based on the information received via the communication module 290. In another embodiment of the disclosure, the processor 220 may transmit information about the current operating state to the external electronic device via the communication module 290, and the user may identify the operating state of the acoustic device 200 via the external electronic device.

According to various embodiments of the disclosure, the speaker unit 255 may receive an electrical signal from the processor 220 to generate sound and output the sound to the outside. For example, the speaker unit 255 may output a multimedia sound or received sound, and may be controlled by the processor 220 with different attributes depending on an operation mode or the type of an ear tip 302 or 303 coupled to the main body 301.

According to various embodiments of the disclosure, the microphone unit 250 may include a plurality of microphones 250*a*, 250*b*, . . . , and 250*n*, and when including the plurality of microphones 250*a*, 250*b*, . . . , and 250*n*, the microphone unit 250 or the acoustic device 200 may detect the direction of sound or detect external sound. The acoustic device 200 or the processor 220 may suppress or remove noise based on the external sound detected by the microphone unit 250. For example, the processor 220 may attenuate sound other than multimedia sound or received sound output by the speaker unit 255 based on the external sound detected by the microphone unit 250. In some embodiments of the disclosure, in a voice call mode, at least one of the plurality of microphones 250*a*, 250*b*, . . . , and 250*n* may collect a user's voice. In another embodiment of the disclosure, the acoustic device 200 or processor 220 may improve call quality in the voice call mode by enhancing the user's voice and suppressing external sound by using the sound collected via the plurality of microphones 250*a*, 250*b*, . . . , and 250*n*.

Figure 3:
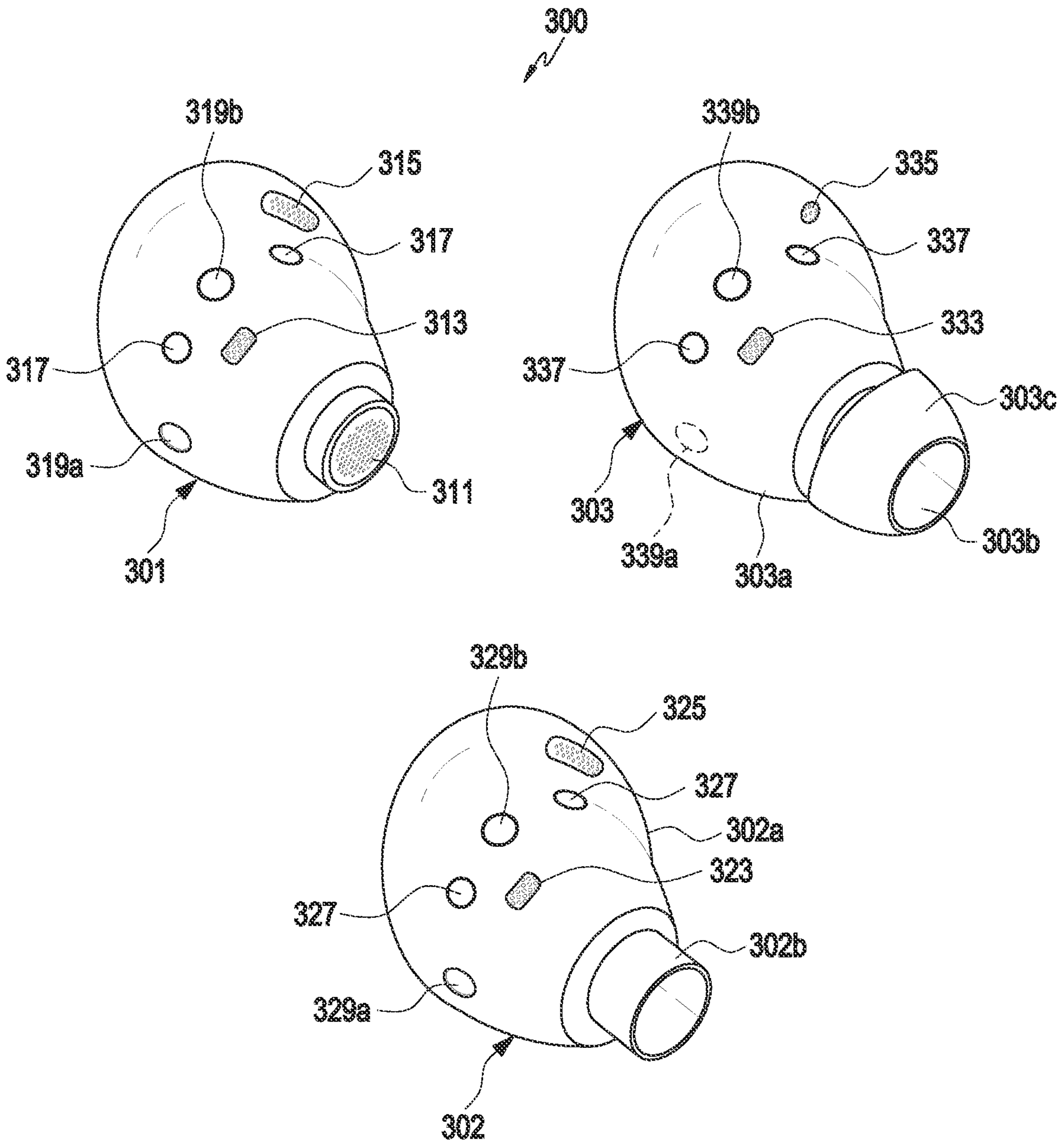
FIG. 3 is a perspective view illustrating an acoustic device according to an embodiment of the disclosure.

According to various embodiments of the disclosure, the sensor module 276 (e.g., the sensor module 176 in FIG. 1) may generate an electrical signal or data value corresponding to an internal operating state or an external environmental state of the acoustic device 200. In some embodiments of the disclosure, the sensor module 276 may determine whether an ear tip 302 or 303 of FIG. 3 is coupled to the main body 301, identify the ear tip 302 or 303 coupled to the main body 301, and/or determine whether the user wears the acoustic device 200. In an embodiment of the disclosure, the processor 220 may adjust an operation attribute of the speaker unit 255 based on information sensed or detected by the sensor module 276. The operation attribute of the speaker unit 255 may include at least one of a parameter related to an equalizer filter, a parameter related to an equalizer gain, a parameter related to acoustic echo cancellation (AEC), a parameter related to active noise cancellation (ANC), and/or a parameter related to noise reduction.

According to various embodiments of the disclosure, depending on an ear tip (e.g., one of the ear tips 302 and 303 in FIG. 3) coupled to the main body (e.g., the main body 301 in FIG. 3), the acoustic device 200 (e.g., the acoustic device 300 in FIG. 3) may be one of an open-type earphone or a canal-type earphone, the sensor module 276 may identify an ear tip 302 or 303 coupled to the main body 301, and the processor 220 may control the operation attribute of the speaker unit 255 based on the information identified by the sensor module 276. The configurations of the main body 301 and the ear tips 302 and 303 of the acoustic device 200 will be described with further reference to FIG. 3.

FIG. 3 is a perspective view illustrating an acoustic device according to an embodiment of the disclosure.

Referring to FIG. 3, an acoustic device 300 may include a main body 301 and a plurality of ear tips 302 and 303. The main body 301 may accommodate, for example, the processor 220, the communication module 290, the sensor module 276, the microphone unit 250, and/or the speaker unit 255 of FIG. 2, and may include one or more acoustic output ports 311 and 313 or at least one air vent port 315. The acoustic output ports 311 and 313 are ports for outputting or emitting sound generated by, for example, the speaker unit (e.g., the speaker unit 255 in FIG. 2) to the outside, and may include a first output port 311 or a second output port 313. For example, the acoustic output ports 311 and 313 may be generally located on the main body 301 in front of the speaker unit 255. According to an embodiment of the disclosure, the air vent port 315 may be located on the main body 301 behind the speaker unit 255, and make the speaker unit 255 (e.g., a diaphragm) smoothly operate or vibrate. For example, it is possible to allow air to flow into or discharge from the main body 301 so that the internal pressure can be easily changed as the diaphragm of the speaker unit 255 vibrates.

According to various embodiments of the disclosure, the first output port 311 may function as a path through which most of the sound generated by the speaker unit 255 is output, and the ventilation amount of the first output port 311 may be utilized in sound tuning the mid-tone and/or high-tone range in the sound of the audible frequency band. For example, as the ventilation amount of the first output port 311 increases, the sound pressure of the sound in the mid-tone range may increase. The second output port 313 may be understood as one of air vent ports according to an embodiment of the disclosure, and the ventilation amount of the second output port 313 may be utilized in tuning the sound in the bass-tone range. For example, as the ventilation amount of the second output port 313 increases, the sound pressure of the sound in the bass-tone range may be lowered. In an embodiment of the disclosure, the air vent port 315 may allow a change in the internal pressure of the main body 301 behind the speaker unit 255, and may be utilized to tune the sound in the mid-bass tone range. For example, when the ventilation amount of the air vent port 315 increases, the sound pressure of the sound in the mid-bass tone range may increase. In another embodiment of the disclosure, when the ventilation amount of the air vent port 315 increases, the sound pressure of the sound in the mid-high tone range may decrease.

According to various embodiments of the disclosure, the acoustic device 300 or the main body 301 may further include a connection terminal 317. The connection terminal 317 may be used, for example, to supply charging power to the acoustic device 300 or to connect the acoustic device 300 to an external electronic device 102 or 104 in a wired manner. Although not illustrated, the acoustic device 300 or the main body 301 may be disposed on or accommodated in a charging cradle in the state of not being worn in a user's body, and the connection terminal 317 may provide electrical connection between the charging cradle and the main body 301.

According to various embodiments of the disclosure, the acoustic device 300 or the main body 301 may further include at least one sensor 319*a* or 319*b*. According to an embodiment of the disclosure, the at least one sensor 319*a* or 319*b* may detect the coupled state of the main body 301 and an ear tip 302 or 303 or identify the ear tip 302 or 303 coupled to the main body 301. According to an embodiment of the disclosure, the at least one sensor 319*a* or 319*b* may further detect whether the acoustic device 300 is worn in the user's body. The illustrated embodiment exemplifies a configuration in which the acoustic device 300 or main body 301 includes a first sensor 319*a* for identifying the coupling state of an ear tip 302 or 303 or the coupled ear tip 302 or 303, or a second sensor 319*b* for detecting whether the acoustic device 300 or main body 301 is worn in the user's body. The first sensor 319*a* may include, for example, an optical sensor or a magnetic sensor. In an embodiment of the disclosure, when implemented as an optical sensor, the first sensor 319*a* may be disposed at a position not interfering with the user's body in the state in which the user wears the acoustic device 300. The position at which the first sensor 319*a* is disposed may be more freely selected when implemented as a magnetic sensor than when implemented as an optical sensor. In another embodiment of the disclosure, the second sensor 319*b* may include an optical sensor. For example, since the second sensor 319*b* is disposed at a position that interferes with the user's body in the state in which the user wears the acoustic device 300 and is not exposed to external light, it is possible to detect the worn state of the acoustic device 300.

According to various embodiments of the disclosure, the ear tips 302 and 303 of the acoustic device 300 may include an elastic material that at least partially comes into contact with the user's body, and may be detachably coupled to the main body 301. One of the ear tips 302 and 303 coupled to the main body 301 may be configured to wear the acoustic device 300 or the main body 301 in the user's body. In an embodiment of the disclosure, of the ear tips 302 and 303, the first ear tip 302 may be coupled to the main body 301 so that the acoustic device 300 operates as an open-type earphone, and of the ear tips 302 and 303, the second ear tip 303 may be coupled to the main body 301 so that the acoustic device 300 operates as a canal-type earphone. For example, the second ear tip 303 may be different from the first ear tip 302 in that the second ear tip 303 includes a structure (e.g., the second coupling portion 303*c*) that comes into close contact with the inner wall of an ear canal (e.g., the ear canal EI in FIG. 8 or 9). In another embodiment of the disclosure, the main body 301 itself may be utilized as an open-type earphone in the state in which the ear tips 302 and 303 are not coupled.

According to various embodiments of the disclosure, the first ear tip 302 may include a coupling portion 302*a* and a first acoustic waveguide portion 302*b*. The coupling portion 302*a* may be coupled to surround at least a portion of the main body 301, and may include a first dummy hole 323 corresponding to the second output port 313, a first opening area 325 corresponding to the air vent port 315, a second dummy hole(s) 327 corresponding to the connection terminal 317, and/or sensor holes 329*a* and 329*b* corresponding to the sensors 319*a* and 319*b*. For example, the coupling portion 302*a* is coupled to surround at least a portion of the main body 301, and may include openings or holes that expose at least one of acoustic output ports 311 and 313, the air vent port 315, the connection terminal 317, and/or the sensors 319*a* and 319*b* disposed in the main body 301 to the outside.

According to various embodiments of the disclosure, the first dummy hole 323 or the first opening area 325 of the first ear tip 302 may have substantially the same shape and size as the second output port 313 or the air vent port 315 of the main body 301, or may be configured to be larger than the second output port 313 or the air vent port 315 of the main body 301. For example, even if the first ear tip 302 is coupled to the main body 301, the acoustic characteristics of the main body 301 may be substantially the same as design specifications. In an embodiment of the disclosure, since the second dummy hole 327 substantially exposes the connection terminal 317 to the outside, even when the first ear tip 302 is coupled to the main body 301, it may be possible to charge the acoustic device 300 or to connect the acoustic device 300 to an external electronic device 102 or 104 in a wired manner. In another embodiment of the disclosure, when the first ear tip 302 is coupled to the main body 301, the sensor holes 329*a* and 329*b* may be disposed to correspond to one of the first sensor 319*a* and the second sensor 319*b*. For example, even when the first ear tip 302 is coupled to the main body 301, the first sensor 319*a* may not substantially detect this, and in this case, the processor (e.g., the processor 120 or 220 of FIG. 1 or 2) may control the acoustic device 300 (e.g., the speaker unit 255 of FIG. 2) according to a first attribute set to correspond to an open-type earphone. In an embodiment of the disclosure, the second sensor 319*b* of the main body 301 or the sensor hole 329*b* of the first ear tip 302 that corresponds to the second sensor 319*b* may be disposed in an area that is obscured by the user's body in the state in which acoustic device 300 is worn in the user's body, whereby the processor 220 may identify or determine whether the acoustic device 300 is worn via the second sensor 319*b*.

According to various embodiments of the disclosure, the first acoustic waveguide portion 302*b* may extend from the coupling portion 302*a* by a predetermined length, and when the first ear tip 302 is coupled to the main body 301, the first acoustic waveguide portion 302*b* may be disposed to correspond to the first output port 311. For example, the sound generated by the speaker unit 255 may be output to the outside via the first sound waveguide portion 302*b*. In the state in which the acoustic device 300 is worn in the user's body, the first acoustic waveguide portion 302*b* may be at least partially disposed inside the ear canal. For example, the sound generated by the speaker unit 255 may reach the user's ear canal or eardrum while being guided by the first sound waveguide portion 302*b*.

According to various embodiments of the disclosure, the second ear tip 303 may include a first coupling portion 303*a*, a second acoustic waveguide portion 303*b*, and/or a second coupling portion 303*c*. The first coupling portion 303*a* may be coupled to surround at least a portion of the main body 301, and may include a first dummy hole 333 corresponding to the second output port 313 of the main body 301, a second opening area 335 corresponding to the air vent port 315, a second dummy hole(s) 337 corresponding to the connection terminal 317 and/or an optical pattern 339*a* or a sensor hole 339*b* corresponding to the sensors 319*a* and 319*b*. For example, the first coupling portion 303*a* is coupled to surround at least a portion of the main body 301, and may include openings or holes that expose at least one of acoustic output ports 311 and 313, the air vent port 315, the connection terminal 317, and/or the sensors 319*a* and 319*b* disposed in the main body 301 to the outside. It is noted that, since the dummy holes 333 and 337 corresponding to the second output port 313 or the connection terminal 317 may provide substantially the same functions at the dummy holes 323 and 327 of the first ear tip 302, in the description of the embodiment of FIG. 3, the same names are given, but reference numerals in the drawings are separately assigned.

According to various embodiments of the disclosure, the first dummy hole 333 of the second ear tip 303 may have substantially the same shape and size as the second output port 313 of the main body 301 or may be configured to be larger than the second output port 313 of the main body 301. According to the acoustic tuning or design of an actual product, the first dummy hole 333 may have a smaller size than the second output port 313. In an embodiment of the disclosure, the second opening area 335 may have a smaller size than the air vent port 315 or the first opening area 325. For example, when the second ear tip 303 is coupled, the area in which the air vent port 315 is exposed to the external space may be smaller than when the first ear tip 302 is coupled. In some embodiments of the disclosure, the air vent port 315 may be substantially closed even though the second opening area 335 is provided. For example, when the second ear tip 303 is coupled, the air vent port 315 may be exposed to the external space in an area smaller than its actual size. According to an embodiment of the disclosure, when comparing the case where the first ear tip 302 is coupled to the main body 301 and the case where the second ear tip 303 is coupled to the main body 301, when the second ear tip 303 is coupled, the internal pressure change behind the speaker unit 225 (e.g., a diaphragm) inside the main body 301 may be suppressed due to the size or shape of the second opening area 335. In another embodiment of the disclosure, since the second ear tip 303 is coupled to the main body 301, it is possible to provide the shape or characteristics of a canal-type earphone, and the sound pressure loss in the mid-bass tone range in an actual use environment may be smaller than that in an open-type earphone. For example, even if the change in the internal pressure of the main body 301 is somewhat suppressed and the sound pressure of the mid-bass tone sound output from the speaker unit 255 becomes smaller than the design specification, the sound in the mid-bass tone range perceived by the user may be substantially the same as the design specification of the main body 301 or the speaker unit 255.

According to various embodiments of the disclosure, since the second dummy hole 337 substantially exposes the connection terminal 317 to the outside, even when the second ear tip 303 is coupled to the main body 301, it may be possible to charge the acoustic device 300 or to connect the acoustic device 300 to an external electronic device 102 or 104 in a wired manner. In another embodiment of the disclosure, the optical pattern 339*a* may be provided on the inner peripheral surface of the first coupling portion 303*a* to be disposed to correspond to the first sensor 319*a* when the second ear tip 303 is coupled to the main body 301. For example, the first sensor 319*a* may be an optical sensor, and by detecting the optical pattern 339*a*, it is possible to detect or identify that the second ear tip 303 is coupled to the main body 301. When it is detected that the second ear tip 303 is coupled to the main body 301, the processor 220 may control the acoustic device 300 (e.g., the speaker unit 255 in FIG. 2) according to a second attribute different from the first attribute, for example, an attribute set to correspond to a canal-type earphone. In another embodiment of the disclosure, when the first sensor 319*a* is a magnetic sensor, a magnet may be disposed at a position where the optical pattern 339*a* is illustrated, and the optical pattern 339*a* may be omitted.

According to various embodiments of the disclosure, the second acoustic waveguide portion 303*b* may extend from the first coupling portion 303*a* by a predetermined length, and when the second ear tip 303 is coupled to the main body 301, the second acoustic waveguide portion 302*b* may be disposed to correspond to the first output port 311. For example, the sound generated by the speaker unit 255 may be output to the outside via the second sound waveguide portion 303*b*. When the acoustic device 300 is worn in the user's body, the second acoustic waveguide portion 303*b* is at least partially disposed inside the ear canal. Thus, the sound generated by the speaker unit 255 is capable of reaching the user's ear canal or eardrum under the guidance of the second acoustic waveguide portion 303*b*.

According to various embodiments of the disclosure, the second coupling portion 303*c* extends from the outer peripheral surface of the second acoustic waveguide portion 303*b*, and may be configured to come into close contact with the inner wall of the user's ear canal. In an embodiment of the disclosure, when the acoustic device 300 in which the second ear tip 303 is coupled to the main body 301 is worn in the user's body, the second acoustic waveguide portion 303*b* and/or the second coupling portion 303*c* may substantially isolate the space between the first output port 311 and the user's eardrum from the outside of the ear canal. For example, the sound generated by the speaker unit 255 may reach the user's eardrum without substantial loss of sound pressure. Since the sound generated from the speaker unit 255 is able to reach the user's eardrum without loss of sound pressure, even if the main body 301 or the speaker unit 255 has output that is slightly lower than the design specification in the state in which the second ear tip 303 is coupled to the main body 301, the sound pressure perceived by the user may be substantially the same as the design specification.

Figure 4:
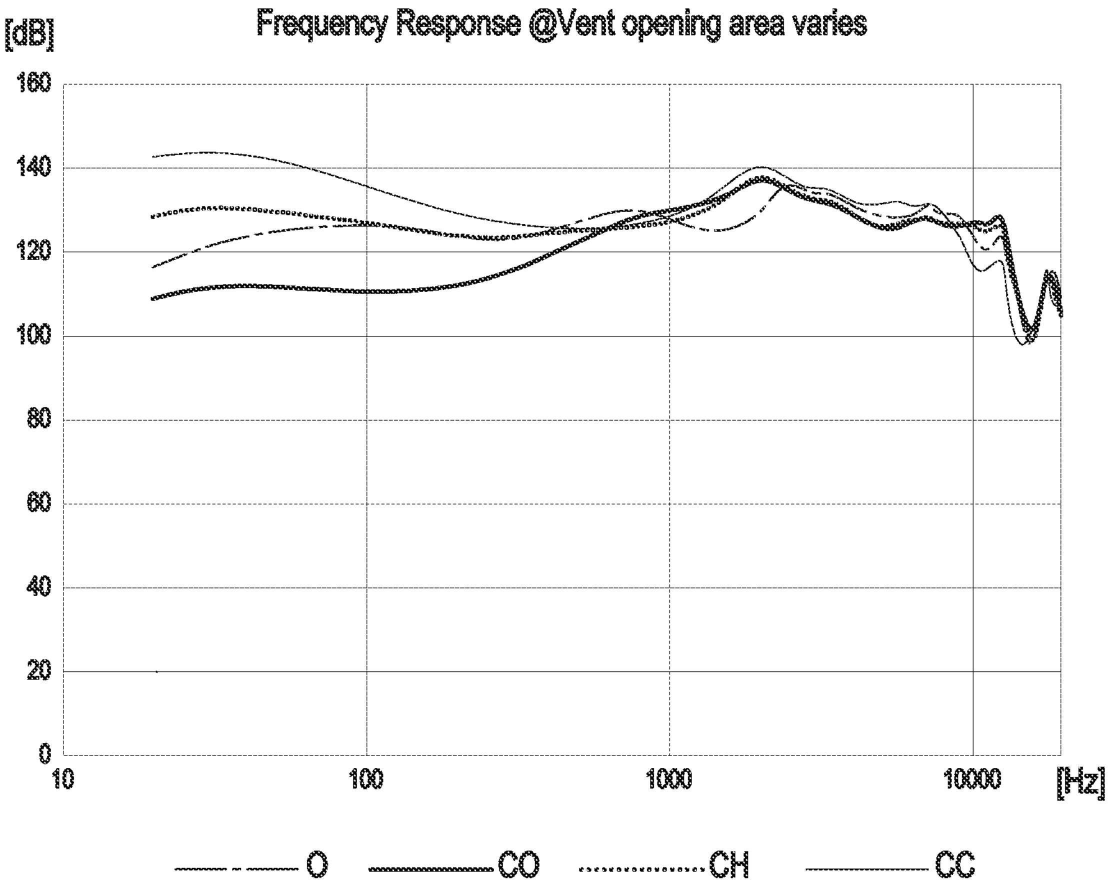
FIG. 4 is a view illustrating graphs representing frequency response characteristics of an acoustic device according to an embodiment of the disclosure.

FIG. 4 is view illustrating graphs representing frequency response characteristics of an acoustic device according to an embodiment of the disclosure.

Referring to FIG. 4, the graph indicated by "0" represents a frequency response characteristic when the acoustic device 300 operates as an open-type earphone, for example, a frequency response characteristic of the main body 301 itself of FIG. 3 or in the state in which the first ear tip 302 is coupled to the main body 301. The graph indicated by "CO" in FIG. 4 represents a frequency response characteristic in the state in which the entire area of the air vent port 315 is substantially open through the second opening area 335 while the second ear tip 303 of FIG. 3 is coupled to the main body 301. The graph indicated by "CH" in FIG. 4 represents a frequency response characteristic in the state in which approximately half of the air vent port 315 is closed by the second ear tip 303 and the other half of the air vent port 315 is opened through the second opening area 335 while the second ear tip 303 of FIG. 3 is coupled to the main body 301. The graph indicated by "CC" in FIG. 4 represents a frequency response characteristics in the state in which the air vent port 315 is substantially closed while the second ear tip 303 of FIG. 3 is coupled to the main body 301. In an embodiment of the disclosure, the graph indicated by "0" may be understood as substantially representing the acoustic characteristic of the acoustic device 300 according to the design specification of the main body 301 or the speaker unit 255.

As illustrated in FIG. 4, in an acoustic frequency band of approximately 400 to 500 Hz or higher, a significant difference in frequency response characteristics depending on the degree of opening or exposure of the air vent port 315 may not occur. It can be seen that with sound in the mid-bass tone range of about 400 Hz or less, in the canal-type earphone, when the second ear tip 303 is coupled, the frequency response characteristics depending on the degree of opening of the air vent port 315 are variously changed. For example, when the second ear tip 303 is coupled to an open-type earphone (e.g., the main body 301 in FIG. 3) so that the acoustic device is used as a canal type, the frequency response characteristic most similar to the design specification of the main body 301 or the speaker unit 225 may be implemented in the state in which approximately half of the air vent port 315 is exposed. As described above, the acoustic device 300 according to various embodiments of the disclosure may be used as an open-type earphone with the main body 301 itself, and may provide substantially the same acoustic characteristics as the design specification of the main body 301 while being used as a canal-type earphone by using an ear tip (e.g., the second ear tip 303) coupled to the main body 301.

Figure 5:
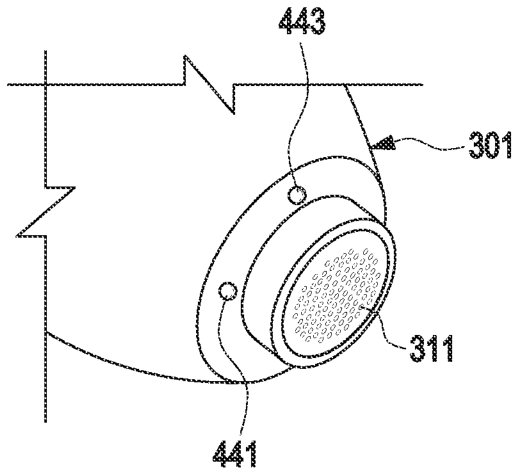
FIG. 5 is an enlarged perspective view of a portion of a main body of an acoustic device according to an embodiment of the disclosure.

FIG. 5 is an enlarged perspective view of a portion of the main body of an acoustic device according to an embodiment of the disclosure.

Figure 6:
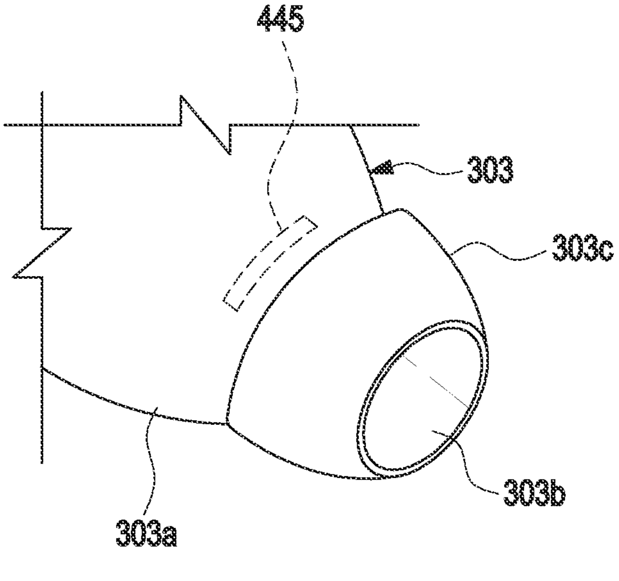
FIG. 6 is an enlarged perspective view of a portion of a second ear tip of an acoustic device according to an embodiment of the disclosure.

FIG. 6 is an enlarged perspective view of a portion of a second ear tip of an acoustic device according to an embodiment of the disclosure.

Figure 7:
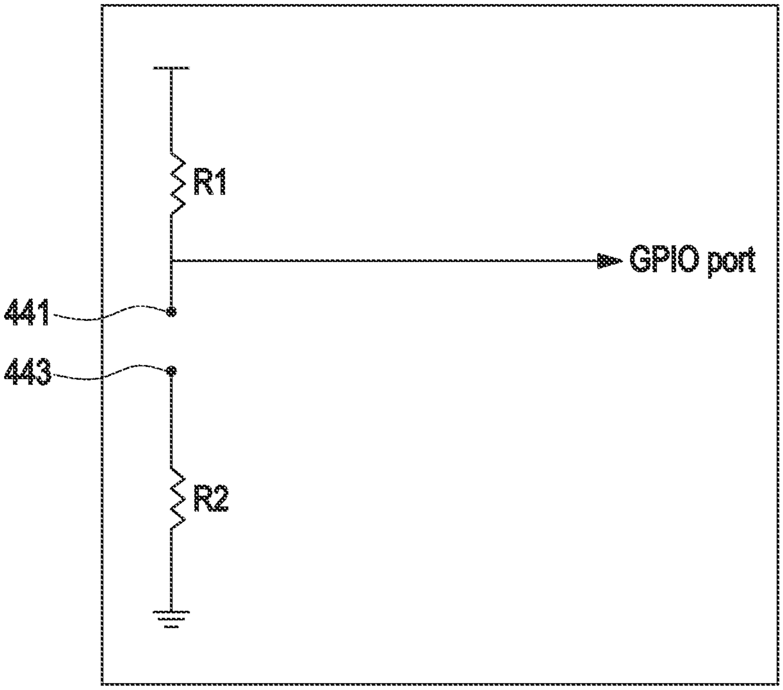
FIG. 7 is a circuit diagram illustrating an ear tip coupling detection circuit of the acoustic device according to an embodiment of the disclosure.

FIG. 7 is a circuit diagram illustrating an ear tip coupling detection circuit of an acoustic device according to an embodiment of the disclosure.

Referring to FIGS. 5, 6, and 7, the acoustic device of the embodiment may be substantially the same as the acoustic device 300 of FIG. 3, and may be different from the embodiment of FIG. 3 in the configuration including the electrodes 441 and 443 or the conductive pattern 445 for identifying whether or not an ear tip 302 or 303 is coupled to the main body 301 or identifying the ear tip 302 or 303 coupled to the main body 301. Accordingly, in the detailed description made with reference to FIGS. 5 and 6, the configuration related to identifying whether an ear tip 302 or 303 is coupled or the type of the coupled ear tip 302 or 303 will be described. Referring to FIGS. 5 and 6, the acoustic device 300 may include a pair of electrodes 441 and 443 disposed on a body 301 or a conductive pattern 445 provided on the inner peripheral surface of the second ear tip 303. The conductive pattern 445 may not be provided in the first ear tip 302. By using the electrodes 441 and 443 and the conductive pattern 445, the acoustic device 300 or the processor 220 may identify whether an ear tip 302 or 303 is coupled and the ear tip 302 or 303 coupled to the main body 301. In this case, one of the sensors **319*a* and 319*b* of FIG. 3, for example, the first sensor 391*a***, may be omitted.

According to various embodiments of the disclosure, of the electrodes 441 and 443, the first electrode 441 may be connected to a general-purpose input/output port (GPIO port) via a first resistive element R1, and the second electrode 443 may be connected to a ground via a second resistive element R2. The conductive pattern 445 may be configured to short-circuit the first electrode 441 and the second electrode 443 when the second ear tip 303 is coupled to the main body 301. In an embodiment of the disclosure, in the state in which a first voltage is applied to the first resistive element R1, when the ear tips 302 and 303 are not coupled to the main body 301 or the first ear tip 302 is coupled to the main body 301, the first voltage may be output to the general purpose input/output port (GPIO port). For example, in the state in which the first electrode 441 and the second electrode 443 are not short-circuited, the voltage of a signal applied to the first resistive element R1 is output to the general-purpose input/output port (GPIO port). In this case, the processor 220 may control the speaker unit 225 based on a first attribute. In another embodiment of the disclosure, when the second ear tip 303 is coupled to the main body 301 in the state in the first voltage is applied to the first resistive element R1, the first electrode 441 and the second electrode 443 may be short-circuited to each other, and a second voltage lower than the first voltage may be output to the general-purpose input/output port (GPIO port). In this case, the processor 220 may control the speaker unit 225 with the second attribute corresponding to the canal-type earphone. As described with reference to FIG. 4, the acoustic characteristics of the acoustic device 300 operating as the canal-type earphone may be tuned depending on the exposure degree of the air vent port 315. In some embodiments of the disclosure, the acoustic characteristics may be tuned according to the attribute controlling the speaker unit 255, and through a combination of the attribute controlling the speaker unit 255 and the degree of exposure of the air vent port 315, the acoustic characteristics of the speaker unit 255 or the acoustic device 300 may be tuned.

Figure 8:
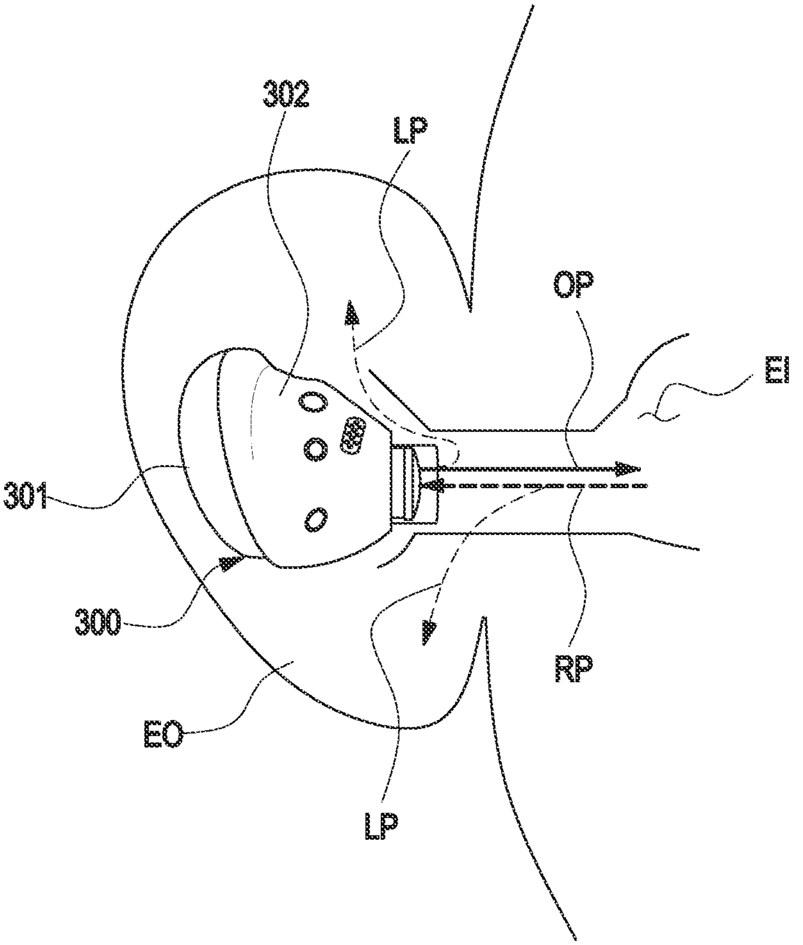
FIG. 8 is a view illustrating a state in which an acoustic device is worn in a user's body in an open-type state according to an embodiment of the disclosure.

FIG. 8 is a view illustrating a state in which an acoustic device is worn in a user's body in an open-type state according to an embodiment of the disclosure.

Figure 9:
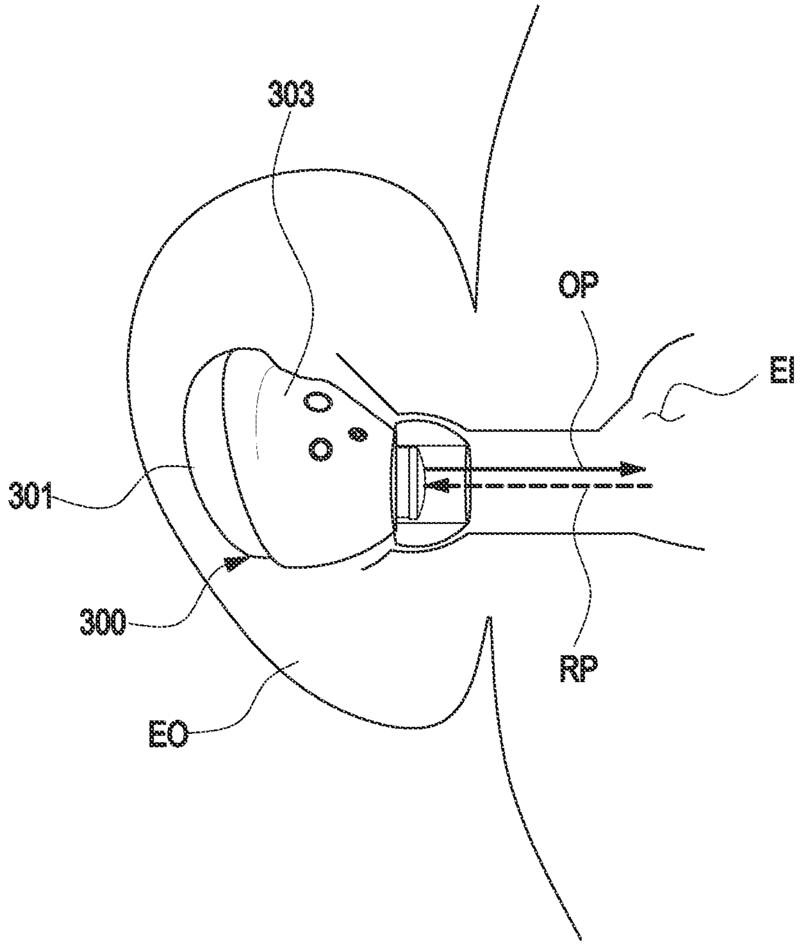
FIG. 9 is a view illustrating a state in which an acoustic device is worn in a user's body in a canal-type state according to an embodiment of the disclosure.

FIG. 9 is a view illustrating a state in which an acoustic device is worn in a user's body in a canal-type state according to an embodiment of the disclosure.

Referring to FIGS. 8 and 9, in the state of being worn in the user's body, the main body 301 or the ear tips 302 and 303 are generally located in an area or space defined by the user's pinna EO, and a portion (e.g., the acoustic waveguide portions 302*b* and 303*b* in FIG. 3) may be disposed inside the ear canal EI. In the state of being worn in the user's body, the relative magnitude of the sound pressure RP reflected from the inside of the ear canal compared to the sound pressure OP output by the acoustic device 300 may vary. For example, if the sound pressure OP output by the acoustic device 300 is the same when operating as an open-type earphone and when operating as a canal-type earphone, the sound pressure RP reflected from the inside of the ear canal may be higher when the acoustic device 300 operates as the canal-type earphone. It may be understood that this is due to the fact that, in the state of being worn in the user's body, the open-type earphone has a structure that allows more pressure to outflow (LP) from the inside of the ear canal than the canal-type earphone.

According to various embodiments of the disclosure, the microphone unit 250, for example, at least one of the microphones 250*a*, 250*b*, . . . , and 250*n* of FIG. 2 may detect the sound pressure (RP) or sound reflected from the inside of the ear canal. The acoustic device 300 or the processor 220 may identify whether the current operating state is an open-type earphone state or a canal-type earphone state by detecting the sound pressure (RP) or sound reflected from the inside of the ear canal. For example, based on the relative difference between the output sound pressure (OP) and the sound pressure (RP) reflected from the inside of the ear canal, the acoustic device 300 or the processor 220 may identify the current operating state or the ear tip 302 or 303 coupled to the main body 301. In some embodiments of the disclosure, the acoustic device 300 or the processor 220 may identify an ear tip 302 or 303 coupled to the main body 301 based on the relative differences in sound pressure, and may control the speaker unit 225 by using an attribute corresponding to the identified ear tip. When set to identify the ear tip 302 or 303 coupled to the main body 301 based on the relative difference in sound pressure, the acoustic device 300 or the main body 301 may not include one of the sensors 319*a* and 319*b* of FIG. 3 (e.g., the first sensor 391*a*) or the electrodes 441 and 443 and the conductive pattern 445 of FIGS. 5 and 6. In another embodiment of the disclosure, although set to identify an ear tip 302 or 303 coupled to the main body 301 based on the relative difference in sound pressure, the acoustic device 300 or the processor 220 may include one of the first sensor 319*a* of FIG. 3 or the electrodes 441 and 443 of FIG. 5, and when including the electrodes 441 and 443 in FIG. 5, the acoustic device 300 or the processor 220 may include a conductive pattern (e.g., the conductive pattern 445 in FIG. 6) provided on the second ear tip 303.

Figure 10:
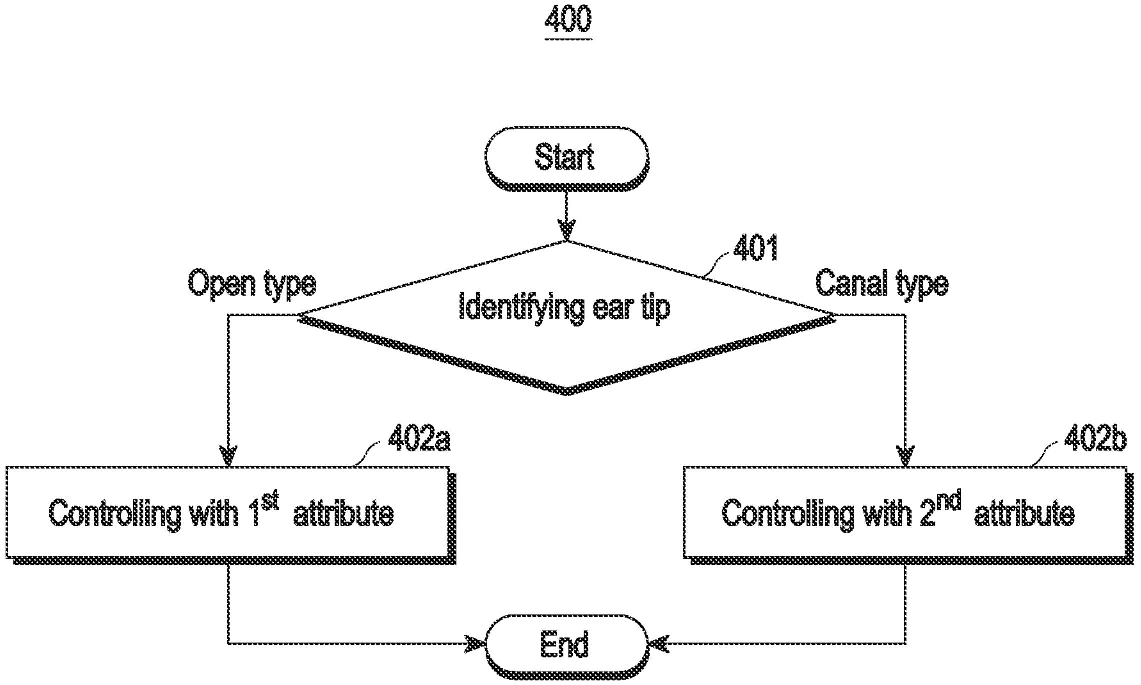
FIG. 10 is a flowchart illustrating a method of controlling an acoustic device according to an embodiment of the disclosure.

FIG. 10 is a flowchart illustrating a method of an acoustic device according to an embodiment of the disclosure.

In describing the control method 400 of the acoustic device 300 according to various embodiments of the disclosure, the above-described embodiments may be referred to together.

Referring to FIG. 10, the control method 400 of the acoustic device 300 may include operation 401 of identifying an ear tip 302 or 303, and operation 402*a* or 402*b* of controlling the speaker unit 255 with an attribute predetermined based on the identified ear tip 302 or 303. For example, the acoustic device 300 or the processor 220 may be configured to identify whether an ear tip 302 or 303 is coupled to the main body 301 or the ear tip 302 or 303 coupled to the main body 301 (e.g., operation 401), and control the speaker unit 255 with an attribute predetermined based on the identified ear tip 302 or 303 (e.g., operation 402*a* or operation 402*b*).

According to various embodiments of the disclosure, in operation 401, the processor 220 may identify whether an ear tip 302 or 303 is coupled to the main body 301 or the ear tip 303 or 303 coupled to the main body 301 by using one of the sensors 319*a* and 319*b* of FIG. 3, the electrodes 441 and 443 of FIG. 5, and/or the microphone unit 250. In some embodiments of the disclosure, the first sensor 319*a* of FIG. 3 may be an optical sensor or a magnetic sensor, and the ear tips 302 and 303 may include an identifier detectable by first sensor 319*a*. The "identifier" may be, for example, an optical pattern or a magnet. In an embodiment of the disclosure, the first ear tip 302 corresponding to the open-type earphone may not include the identifier, and the second ear tip 303 corresponding to the canal-type earphone may include the identifier. For example, when the identifier is not detected, the processor 220 may determine that the ear tips 302 and 303 are not coupled to the main body 301 or that the first ear tip 302 is coupled. In another embodiment of the disclosure, when the second ear tip 303 is coupled to the main body 301, the processor 220 may detect or determine that the second ear tip 303 is coupled to the main body 301 via the first sensor 319*a*. In another embodiment of the disclosure, when the electrodes 441 and 443 of FIG. 5 are disposed on the main body 301, the identifier may be replaced with the conductive pattern 445 of FIG. 6. For example, when the electrodes 441 and 443 are short-circuited by the conductive pattern 445, the processor 220 may identify or determine that the second ear tip 303 is coupled to the main body 401.

According to various embodiments of the disclosure, when it is determined in operation 401 that the acoustic device 300 is able to operate as an open-type earphone, the processor 220 may control the speaker unit 255 with the first attribute of operation 402*a*. In some embodiments of the disclosure, when determining that the acoustic device 300 is able to operate as an open-type earphone, the processor 220 may output a voice that is capable of notifying the user that the acoustic device 300 is currently operating as the open-type earphone via the speaker unit 255. In operation 401, when determining that the acoustic device 300 is able to operate as a canal-type earphone, the processor 220 may control the speaker unit 255 with the second attribute of operation 402*b*. In some embodiments of the disclosure, when determining that the acoustic device 300 is able to operate as a canal-type earphone, the processor 220 may output a voice that is capable of notifying the user that the acoustic device 300 is currently operating as the canal-type earphone via the speaker unit 255. The first attribute and the second attribute may include at least one of a parameter related to an equalizer filter, a parameter related to an equalizer gain, a parameter related to acoustic echo cancellation (AEC), a parameter related to active noise cancellation (ANC), and/or a parameter related to noise reduction. In some embodiments of the disclosure, the speaker unit 255 may have a higher output in the mid-bass region when controlled with the first attribute than when controlled with the second property.

In some embodiments of the disclosure, the parameters listed above may be different depending on the type of sound output from the acoustic device 200 or 300, as in a multimedia playback mode or a voice call mode. For example, for convenience of description, the attribute of controlling the speaker unit 255 will be described by diving it into a first attribute and a second attribute depending on the ear tip 302 or 303 coupled to the main body 301. However, various embodiments of the disclosure are not limited thereto, and the attributes for controlling the speaker unit 255 may be variously selected depending on the type of sound output from the acoustic device 300 or the operation mode of an external electronic device 102 or 104 interlocked with the acoustic device 300. In another embodiment of the disclosure, when the acoustic device 300 is linked with an external electronic device 102 or 104, such as a smartphone, for example, when a sound source is substantially provided from the external electronic device 102 or 104, the acoustic device 300 or the processor 220 may transmit information about the current operation mode or operation state to the external electronic device while performing wireless communication by using the communication module 290. The user may identify the information transmitted from the acoustic device 300 via the external electronic device 102 or 014 and, if necessary, adjust the operating state of the acoustic device 300 by using the external electronic device 102 or 104.

According to various embodiments of the disclosure, depending on the ear tip 302 or 303 coupled to the main body 301, the acoustic device 300 may operate as an open type or a canal type, so that the user may also use a single acoustic device 300 in a type that meets the environment of use or the user's needs. By adjusting the exposed area of the air vent port 315 or changing the control attributes of the speaker unit 255 depending on whether the ear tip 302 or 303 is of the open type or the canal type, the user may be provided with sound of substantially the same sound quality regardless whether the ear tip is of the canal type or the open type. For example, a user may conveniently use the acoustic device 300 suitable for the environment of use without the economic burden or inconvenience of owning or carrying a plurality of acoustic devices.

Figure 11:
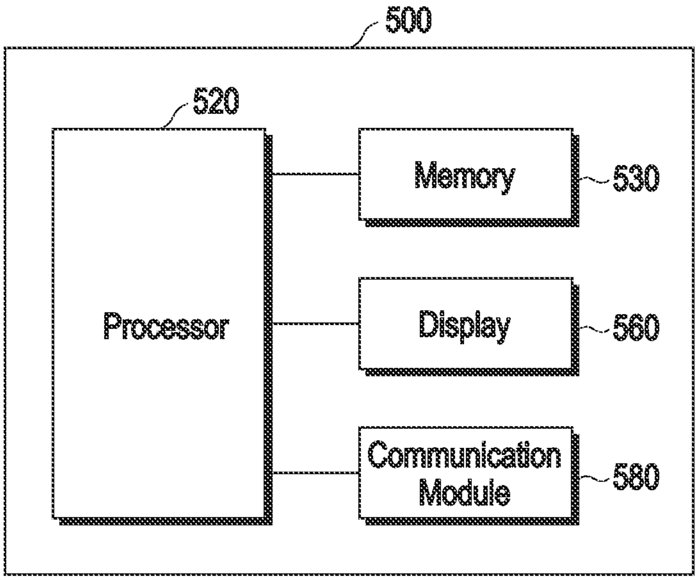
FIG. 11 is a block diagram illustrating an electronic device according to an embodiment of the disclosure.

FIG. 11 is a block diagram illustrating an electronic device according to an embodiment of the disclosure.

Referring to FIG. 11, the electronic device 500 (e.g., the electronic device 101 in FIG. 1) may include a processor 520, a memory 530, a display 560, and a communication module 580.

According to various embodiments of the disclosure, the electronic device 500 may be implemented to be substantially the same as or similarly to the electronic device 101 of FIG. 1. For example, the electronic device 500 may be implemented as a smartphone supporting Bluetooth communication.

According to various embodiments of the disclosure, the electronic device 500 may create a communication link with a pair of acoustic devices (the acoustic device 200 and 300 in FIG. 2 or 3) by using the communication module 580 (e.g., Bluetooth communication).

According to an embodiment of the disclosure, the at least one electronic device 500 may be implemented to be the same as or similar to the electronic device 102 or 104 described with reference to FIG. 1. According to an embodiment of the disclosure, the acoustic device (a pair of acoustic devices) 300 may be an electronic device supporting Bluetooth communication.

According to various embodiments of the disclosure, the processor 520 may control the overall operation of the electronic device 500. For example, the processor 520 may be implemented to be substantially the same as or similar to the processor 120 of FIG. 1.

According to various embodiments of the disclosure, based on the information (e.g., first information or second information) received from the acoustic device 300 in which a communication link is generated, the processor 520 may display state information that informs whether the acoustic device 300 is operating as an open-type earphone or a canal-type earphone.

According to an embodiment of the disclosure, when receiving the first information notifying that the acoustic device 300 is operating as the open-type earphone, the processor 520 may display, on the display 560, a pop-up window including the state information notifying that the acoustic device 300 is currently operating as the open-type earphone.

According to an embodiment of the disclosure, based on the first information, the processor 520 may additionally include, on the pop-up window, control information notifying that the speaker unit 255 of the acoustic device 300 is controlled with the first attribute information along with the state information notifying that the acoustic device 300 is currently operating as the open-type earphone, and display the pop-up window on the display 560.

According to an embodiment of the disclosure, when receiving the second information notifying that the acoustic device 300 is operating as the canal-type earphone from the acoustic device 300, the processor 520 may display, on the display 560, a pop-up window including the state information notifying that the acoustic device is currently operating as the canal-type earphone.

According to an embodiment of the disclosure, based on the second information, the processor 520 may additionally include, on the pop-up window, control information notifying that the speaker unit 255 of the acoustic device 300 is controlled with the second attribute information along with the state information notifying that the acoustic device 300 is currently operating as the open-type earphone, and display the pop-up window on the display 560.

According to various embodiments of the disclosure, when a first application capable of controlling the acoustic device 300 is executed, the processor 520 may display state information notifying whether the acoustic device 300 is operating as the open-type earphone or the canal-type earphone on the execution screen of the first application.

According to an embodiment of the disclosure, when receiving from the acoustic device 300 the first information indicating that the acoustic device 300 is operating as the open-type earphone and determining the execution of the first application, the processor 520 may display, on the execution screen of the first application, state information indicating that the acoustic device 300 is currently operating as the open-type earphone.

According to an embodiment of the disclosure, based on the first information, the processor 520 may additionally display, on the execution window of the first application, control information notifying that the speaker unit 255 of the acoustic device 300 is controlled with the first attribute information along with the state information notifying that the acoustic device 300 is currently operating as the open-type earphone.

According to an embodiment of the disclosure, when receiving, from the acoustic device 300, the second information indicating that the acoustic device 300 is operating as the canal-type earphone and determining the execution of the first application, the processor 520 may display, on the execution screen of the first application, state information indicating that the acoustic device 300 is currently operating as the canal-type earphone.

According to an embodiment of the disclosure, based on the second information, the processor 520 may additionally display, on the execution window of the first application, control information notifying that the speaker unit 255 of the acoustic device 300 is controlled with the second attribute information along with the state information notifying that the acoustic device 300 is currently operating as the canal-type earphone.

According to various embodiments of the disclosure, the memory 330 may be implemented to be substantially the same as or similar to the memory 130 of FIG. 1.

According to an embodiment of the disclosure, information (e.g., the first information or second information) received from the acoustic device 300 may be stored in the memory 330.

According to various embodiments of the disclosure, the display 360 may be implemented to be substantially the same as or similar to the display module 160 of FIG. 1.

According to an embodiment of the disclosure, the display 360 may display state information notifying whether the acoustic device 300 is operating as the open-type earphone or the canal-type earphone.

According to various embodiments of the disclosure, the communication module 580 may be implemented to be substantially the same as or similar to the communication module 190 of FIG. 1, and may include a plurality of communication modules using different communication technologies including the communication module 580. According to an embodiment of the disclosure, the communication module 580 may be a communication module capable of performing Bluetooth communication, and may perform Bluetooth legacy communication and BLE communication.

Figure 12:
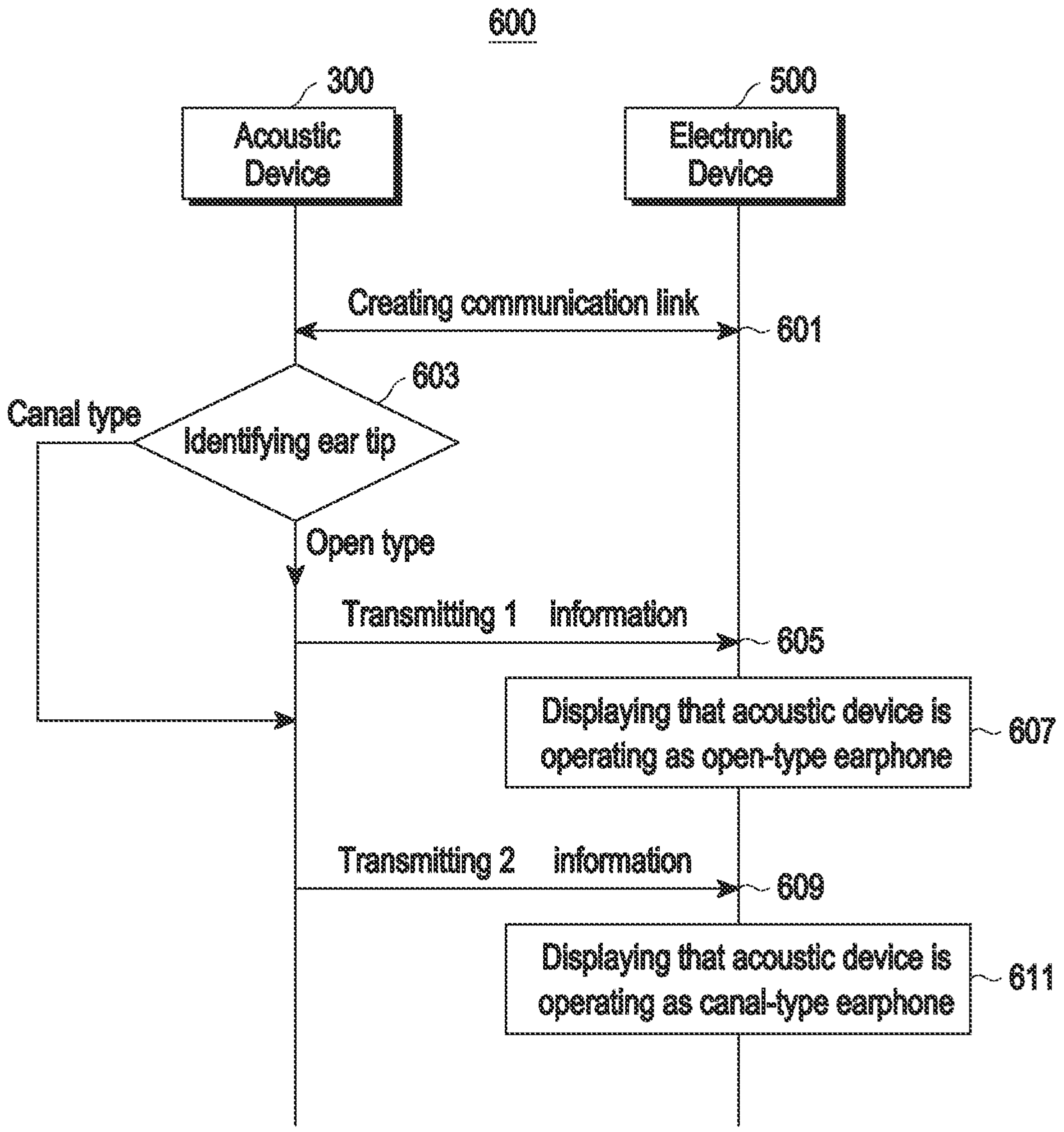
FIG. 12 is a flowchart illustrating a method of displaying state information of an acoustic device in an electronic device according to an embodiment of the disclosure.

FIG. 12 is a flowchart illustrating a method of displaying state information of an acoustic device in an electronic device according to an embodiment of the disclosure.

Referring to FIG. 12, the state information display operation of an acoustic device (e.g., the acoustic device 200 or 300 of FIG. 2 or 3) in the electronic device may include operations 601 to 611. According to an embodiment of the disclosure, at least one of operations 601 to 611 may be omitted, the order of some operations may be changed, or other operations may be added.

In operation 601, a communication link may be created between the acoustic device 300 and the electronic device 500.

According to an embodiment of the disclosure, a communication link may be created between the acoustic device 300 and the electronic device 500 based on the Bluetooth communication of the communication module 580.

In operation 603, the acoustic device 300 may identify an ear tip coupled to the acoustic device 300.

In operation 603, when identifying that the ear tip coupled to the acoustic device 300 is a first ear tip (e.g., the first ear tip 302 in FIG. 3), the acoustic device 300 may determine that the acoustic device 300 operates as an open-type earphone, and control the speaker unit 255 of the acoustic device 300 with a first attribute.

In operation 605, the acoustic device 300 may transmit, to the electronic device 500, first information notifying that the acoustic device is operating as the open-type earphone.

In operation 607, the electronic device 500 may display that the acoustic device 300 is operating as the open-type earphone based on the first information.

According to an embodiment of the disclosure, when receiving the first information notifying that the acoustic device 300 is operating as the open-type earphone, the electronic device 500 may display, on the display 560 thereof, a pop-up window including the state information notifying that the acoustic device 300 is currently operating as the open-type earphone.

According to an embodiment of the disclosure, based on the first information, the electronic device 500 may display, on the display 560, a pop-up window including control information notifying that the speaker unit 255 of the acoustic device 300 is controlled with the first attribute information along with the state information notifying that the acoustic device 300 is currently operating as the open-type earphone.

In operation 603, when identifying that the ear tip coupled to the acoustic device 300 is a second ear tip (e.g., the second ear tip 303 in FIG. 3), the acoustic device 300 may determine that the acoustic device 300 operates as a canal-type earphone, and control the speaker unit 255 of the acoustic device 300 with a second attribute.

In operation 609, the acoustic device 300 may transmit, to the electronic device 500, second information notifying that the acoustic device is operating as the open-type earphone.

In operation 607, the electronic device 500 may display that the acoustic device 300 is operating the canal-type earphone based on the second information.

According to an embodiment of the disclosure, when receiving the second information notifying that the acoustic device 300 is operating as the canal-type earphone, the electronic device 500 may display, on the display 560 thereof, a pop-up window including the state information notifying that the acoustic device 300 is currently operating as the canal-type earphone.

According to an embodiment of the disclosure, based on the second information, the electronic device 500 may display, on the display 560, a pop-up window including control information notifying that the speaker unit 255 of the acoustic device 300 is controlled with the second attribute information along with the state information notifying that the acoustic device 300 is currently operating as the canal-type earphone.

Figure 13:
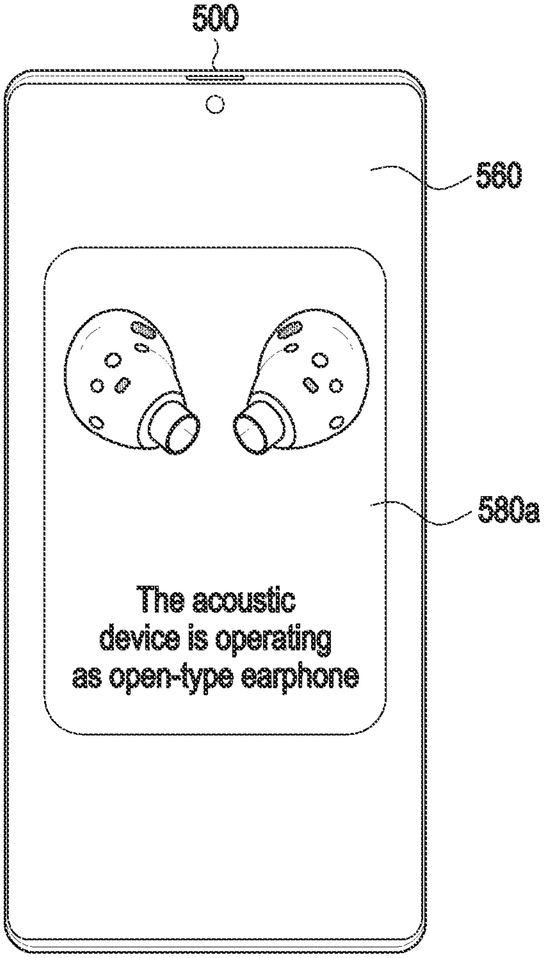
FIGS. 13 and 14 are views for describing an operation of displaying state information of an acoustic device in an electronic device according to various embodiments of the disclosure.
Figure 14:
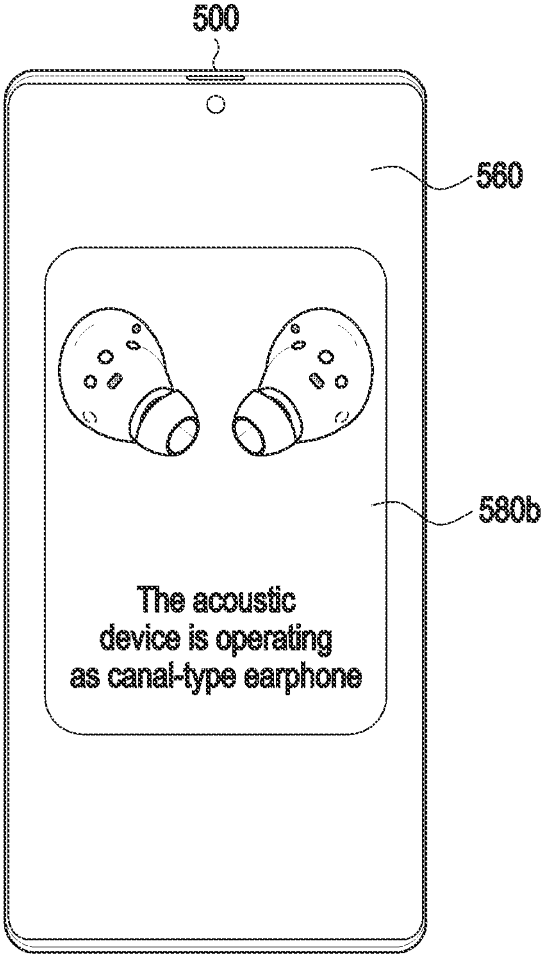

FIGS. 13 and 14 are views for describing operations of displaying state information of an acoustic device in an electronic device according to various embodiments of the disclosure.

Referring to FIG. 13, when receiving first information notifying that the acoustic device 300 is operating as an open-type earphone from the acoustic device 300 to which a communication link is set, based on the first information, the electronic device 500 may display, on the display 560 of thereof, a pop-up window 580*a* including the state information notifying that the acoustic device 300 is currently operating as the open-type earphone.

Referring to FIG. 14, when receiving second information notifying that the acoustic device 300 is operating as a canal-type earphone from the acoustic device 300 to which a communication link is set, based on the second information, the electronic device 500 may display, on the display 560 of thereof, a pop-up window 580*b* including the state information notifying that the acoustic device 300 is currently operating as the canal-type earphone.

According to various embodiments of the disclosure, an acoustic device (e.g., the acoustic device 200 or 300 in FIG. 2 or 3) and/or an electronic device (e.g., the electronic device 101 or 500 in FIG. 1 or 5) including the same may include a main body (e.g., the main body 301 in FIG. 3) including at least one acoustic output port (e.g., the first output port 311 or the second output port 313 in FIG. 3) and at least one air vent port (e.g., the air vent port 315 in FIG. 3), a speaker unit (e.g., the speaker unit 255 in FIG. 2)

accommodated in the main body, a first ear tip (e.g., the first ear tip in FIG. 3) including at least one first opening area (e.g., first opening area 325 in FIG. 3) corresponding to the at least one air vent port and detachably coupled to the main body, and a second ear tip (e.g., the second ear tip 303 in FIG. 3) including at least one second opening area (e.g., the second opening area 335 in FIG. 3) corresponding to the at least one air vent port and detachably coupled to the main body, wherein one of the first ear tip and the second ear tip may be coupled to the main body so that the main body is worn in a user's ear, and when the first ear tip is mounted, a larger area of the at least one air vent port may be exposed to an external space through the at least one first opening area than when the second ear tip is mounted.

According to various embodiments of the disclosure, the acoustic device and/or the electronic device including the same may further include a processor (e.g., the processor 120 or 220 in FIG. 1 or 2) accommodated in the main body, wherein the processor may be configured to identify at least one of the first ear tip or the second ear tip coupled to the main body, and control the speaker unit based on the ear tip identified from among the first ear tip or the second ear tip.

According to various embodiments of the disclosure, the acoustic device and/or the electronic device including the same may further include a processor accommodated in the main body, wherein the processor may be configured to recognize the second ear tip coupled to the main body, control the speaker unit with a first attribute when the second ear tip is not recognized, and control the speaker unit with a second attribute different from the first attribute when the second ear tip is recognized.

According to various embodiments of the disclosure, the first attribute or the second attribute may include at least one of a parameter related to an equalizer filter, a parameter related to an equalizer gain, and a parameter related to acoustic echo cancellation (AEC), a parameter related to active noise cancellation (ANC), or a parameter related to noise reduction.

According to various embodiments of the disclosure, the acoustic device and/or the electronic device including the same may further include a communication module (e.g., the communication module 190 or 290 of FIG. 1 or 2) accommodated in the main body, and the processor may be configured to perform wireless communication with an external electronic device by using the communication module.

According to various embodiments of the disclosure, the second ear tip may include a first coupling portion (e.g., the first coupling portion 303*a* in FIG. 3) coupled to surround at least a portion of the main body, an acoustic waveguide portion (e.g., the second acoustic waveguide portion 303*b* of FIG. 3) extending from the first coupling portion and corresponding to the acoustic output port, and a second coupling portion (e.g., the second coupling portion 303*c* in FIG. 3) extending from an outer peripheral surface of the acoustic waveguide portion and configured to come into close contact with the inner wall of the user's ear canal.

According to various embodiments of the disclosure, the acoustic device and/or the electronic device including the same may further include a pair of electrodes (e.g., the electrodes 441 and 443 in FIG. 5) exposed to the outer peripheral surface of the main body, and a conductive pattern provided on an inner surface of the first coupling portion or the acoustic waveguide portion and configured to short-circuit the electrodes when the second ear tip is coupled to the main body (e.g., the conductive pattern 445 in FIG. 5).

According to various embodiments of the disclosure, the acoustic device and/or the electronic device including the same may further include a processor configured to identify that the second ear tip is coupled to the main body based on the short-circuit of the electrodes.

According to various embodiments of the disclosure, the acoustic device and/or an electronic device including the same may further include at least one optical sensor (e.g., the optical sensor provided as the first sensor 319*a* in FIG. 3) disposed on the main body, and an optical pattern (e.g., the optical pattern 339*a* in FIG. 3) provided on an inner surface of the first coupling portion or the acoustic waveguide portion and configured to be disposed to correspond to the at least one optical sensor when the second ear tip is coupled to the main body.

According to various embodiments of the disclosure, the acoustic device and/or the electronic device including the same may further include a processor that detects the optical pattern by using the at least one optical sensor, wherein the processor is configured to identify that the second ear tip is coupled to the main body when the optical pattern is detected.

According to various embodiments of the disclosure, the acoustic device and/or an electronic device including the same may further include a magnetic sensor (e.g., the magnetic sensor provided as the first sensor 319*a* in FIG. 3) disposed on the main body, and a magnet (e.g., the magnet disposed at the position of the optical pattern 339*a* in FIG. 3) provided in the first coupling portion or the acoustic waveguide portion and configured to be disposed to correspond to the magnetic sensor when the second ear tip is coupled to the main body.

According to various embodiments of the disclosure, the acoustic device and/or the electronic device including the same may further include a processor that detects the magnet by using the magnetic sensor, wherein the processor is configured to identify that the second ear tip is coupled to the main body when the magnet is detected.

According to various embodiments of the disclosure, the acoustic device and/or the electronic device including the same may further include a microphone unit (e.g., the microphone unit 250 in FIG. 2) configured to receive at least a part of sound output from the speaker unit, and a processor configured to identify an ear tip coupled to the main body from among the first ear tip and the second ear tip based on the sound received from the microphone unit.

According to various embodiments of the disclosure, an electronic device (e.g., the electronic device 101 or 500 of FIG. 1 or 5) may include a main body (e.g., the main body 301 in FIG. 3) including at least one acoustic output port (e.g., the first output port 311 or the second output port 313 in FIG. 3) and at least one air vent port (e.g., the air vent port 315 in FIG. 3), a speaker unit (e.g., the speaker unit 255 of FIG. 2) accommodated in the main body, a processor (e.g., the processor 120 or 220 in FIG. 1 or 2) accommodated in the main body, a communication module (e.g., the communication module 190 or 290 in FIG. 1 or 2) accommodated in the main body, a first ear tip (e.g., the first ear tip 302 in FIG. 3) including at least one first opening area (e.g., the first opening area 325 in FIG. 3) corresponding to the at least one air vent port and detachably coupled to the main body, a second ear tip (e.g., the second ear tip 303 in FIG. 3) including at least one second opening area (e.g., the second opening area 335 in FIG. 3) corresponding to the at least one air vent port and detachably coupled to the main body, wherein one of the first ear tip and the second ear tip is coupled with the main body so that the main body is worn in a user's ear, and the processor may be configured to identify at least one of the first ear tip or the second ear tip coupled to the main body, control the speaker unit based on the ear tip identified from among the first ear tip or the second ear tip, and transmit information about the control of the speaker unit to an external electronic device by using the communication module.

According to various embodiments of the disclosure, when the first ear tip is mounted, a larger area of the at least one air vent port may be exposed to an external space through the at least one first opening area than when the second ear tip is mounted.

According to various embodiments of the disclosure, the second ear tip may include a first coupling portion (e.g., the first coupling portion 303*a* in FIG. 3) coupled to surround at least a portion of the main body, an acoustic waveguide portion (e.g., the second acoustic waveguide portion 303*b* of FIG. 3) extending from the first coupling portion and corresponding to the acoustic output port, and a second coupling portion (e.g., the second coupling portion 303*c* in FIG. 3) extending from an outer peripheral surface of the acoustic waveguide portion and configured to come into close contact with the inner wall of the user's ear canal.

According to various embodiments of the disclosure, the electronic device may further include a pair of electrodes (e.g., the electrodes 441 and 443 in FIG. 5) exposed on an outer peripheral surface of the main body, and a conductive pattern (e.g., conductive pattern 445 in FIG. 5) provided in the second ear tip and configured to short-circuit the electrodes when the second ear tip is coupled to the main body, wherein the processor may be configured to identify that the second ear tip is coupled to the main body based on the short-circuit of the electrodes.

According to various embodiments of the disclosure, the electronic device may further include at least one optical sensor (e.g., the optical sensor provided as the first sensor 319*a* in FIG. 3) disposed in the main body, and an optical pattern (e.g., the optical pattern 339*a* in FIG. 3) provided in the second ear tip and disposed to correspond to the at least one optical sensor when the second ear tip is coupled to the main body, wherein the processor may be configured to detect the optical pattern by using the at least one optical sensor and identify that the second ear tip is coupled to the main body when the optical pattern is detected.

According to various embodiments of the disclosure, the electronic device may further include a magnetic sensor (e.g., the magnetic sensor provided as the first sensor 319*a* in FIG. 3) disposed on the main body, and a magnet (e.g., the magnet disposed at the position of the optical pattern 339*a* in FIG. 3) provided in the second ear tip and configured to be disposed to corresponding to the magnetic sensor when the second ear tip is coupled to the main body, wherein the processor may be configured to detect the magnet by using the magnetic sensor, and identify that the second ear tip is coupled to the main body when the magnet is detected.

According to various embodiments of the disclosure, the electronic device may further include a microphone unit (e.g., the microphone unit 250 in FIG. 2) configured to receive at least a part of sound output from the speaker unit, and a processor configured to identify an ear tip coupled to the main body from among the first ear tip and the second ear tip based on the sound received from the microphone unit.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An acoustic device comprising:
- a main body including at least one acoustic output port and at least one air vent port;
- a speaker unit accommodated in the main body;
- a first ear tip including at least one first opening area corresponding to the at least one air vent port and detachably coupled to the main body; and
- a second ear tip including at least one second opening area corresponding to the at least one air vent port and detachably coupled to the main body,
- wherein one of the first ear tip or the second ear tip is coupled to the main body so that the main body is worn in a user's ear, and
- when the first ear tip is mounted, a larger area of the at least one air vent port is exposed to an external space through the at least one first opening area than when the second ear tip is mounted.

2. The acoustic device of claim 1, further comprising:
- memory storing one or more computer programs; and
- one or more processors accommodated in the main body and communicatively coupled to the memory,
- wherein the one or more computer programs include computer-executable instructions that, when executed by the one or more processors individually or collectively, cause the acoustic device to:
  - identify at least one of the first ear tip or the second ear tip coupled to the main body, and
  - control the speaker unit based on an ear tip identified from among the first ear tip or the second ear tip.

3. The acoustic device of claim 1, further comprising:
- one or more processors accommodated in the main body,
- wherein the one or more computer programs include computer-executable instructions that, when executed by the one or more processor-processors individually or collectively cause the acoustic device to:
  - recognize the second ear tip coupled to the main body,
  - control the speaker unit with a first attribute when the second ear tip is not recognized, and
  - control the speaker unit with a second attribute different from the first attribute when the second ear tip is recognized.

4. The acoustic device of claim 3, wherein the first attribute or the second attribute includes at least one of:
- a parameter related to an equalizer filter;
- a parameter related to an equalizer gain, and a parameter related to acoustic echo cancellation (AEC);
- a parameter related to active noise cancellation (ANC); or
- a parameter related to noise reduction.

5. The acoustic device of claim 3, further comprising:
- a communication module accommodated in the main body,
- wherein the one or more computer programs include computer-executable instructions that, when executed by the one or more processors individually or collectively, cause the acoustic device to perform wireless communication with an external electronic device by using the communication module.

6. The acoustic device of claim 1, wherein the second ear tip includes:
- a first coupling portion coupled to surround at least a portion of the main body;

an acoustic waveguide portion extending from the first coupling portion and corresponding to the acoustic output port; and a second coupling portion extending from an outer peripheral surface of the acoustic waveguide portion and configured to come into close contact with an inner wall of a user's ear canal.

7. The acoustic device of claim 6, further comprising:

a pair of electrodes exposed on an outer peripheral surface of the main body; and a conductive pattern provided on an inner surface of the first coupling portion or the acoustic waveguide portion and configured to short-circuit the electrodes when the second ear tip is coupled to the main body.

8. The acoustic device of claim 7, further comprising:

memory storing one or more computer programs; and one or more processors communicatively coupled to the memory, wherein the one or more computer programs include computer-executable instructions that, when executed by the one or more processors individually or collectively, cause the acoustic device to identify that the second ear tip is coupled to the main body based on the short-circuit of the electrodes.

9. The acoustic device of claim 6, further comprising:

at least one optical sensor disposed on the main body; and an optical pattern provided on an inner surface of the first coupling portion or the acoustic waveguide portion to be disposed to correspond to the at least one optical sensor when the second ear tip is coupled to the main body.

10. The acoustic device of claim 9, further comprising:

memory storing one or more computer programs; and or more processors communicatively coupled to the memory, wherein the one or more computer programs include computer-executable instructions that, when executed by the one or more processors individually or collectively, cause the acoustic device to:

detect the optical pattern by using the at least one optical sensor, and identify that the second ear tip is coupled to the main body when the optical pattern is detected.

11. The acoustic device of claim 6, further comprising:

a magnetic sensor disposed on the main body; and a magnet provided in the first coupling portion or the acoustic waveguide portion and configured to be disposed to correspond to the magnetic sensor when the second ear tip is coupled to the main body.

12. The acoustic device of claim 11, further comprising:

memory storing one or more computer programs; and one or more processors communicatively coupled to the memory, wherein the one or more computer programs include computer-executable instructions that, when executed by the one or more processors individually or collectively, cause the acoustic device to:

detect the magnet by using the magnetic sensor, and identify that the second ear tip is coupled to the main body when the magnet is detected.

13. The acoustic device of claim 1, further comprising:

a microphone unit configured to receive at least a part of sound output from the speaker unit;

memory storing one or more computer programs; and one or more processors communicatively coupled to the microphone unit and the memory, wherein the one or more computer programs include computer-executable instructions that, when executed by the one or more processors individually or collectively, cause the acoustic device to identify an ear tip coupled to the main body from among the first ear tip and the second ear tip based on the sound received from the microphone unit.

14. An electronic device comprising:

a main body including at least one acoustic output port and at least one air vent port;

a speaker unit accommodated in the main body;

memory storing one or more computer programs;

one or more processors accommodated in the main body and communicatively coupled to the main body, the speaker unit, and the memory;

a communication module accommodated in the main body;

a first ear tip including at least one first opening area corresponding to the at least one air vent port and detachably coupled to the main body; and a second ear tip including at least one second opening area corresponding to the at least one air vent port and detachably coupled to the main body, wherein one of the first ear tip or the second ear tip is coupled to the main body so that the main body is worn in a user's ear, wherein the one or more computer programs include computer-executable instructions that, when executed by the one or more processors individually or collectively, cause the electronic device to:

identify at least one of the first ear tip or the second ear tip coupled to the main body, control the speaker unit based on an ear tip identified from among the first ear tip or the second ear tip, and transmit information about the control of the speaker unit to an external electronic device by using the communication module, and wherein, when the first ear tip is mounted, a larger area of the at least one air vent port is exposed to an external space through the at least one first opening area than when the second ear tip is mounted.

15. The electronic device of claim 14, wherein the second ear tip includes:

a first coupling portion coupled to surround at least a portion of the main body;

an acoustic waveguide portion extending from the first coupling portion and corresponding to the acoustic output port; and a second coupling portion extending from an outer peripheral surface of the acoustic waveguide portion and configured to come into close contact with an inner wall of a user's ear canal.

16. The electronic device of claim 14, further comprising:

a pair of electrodes exposed to an outer peripheral surface of the main body; and a conductive pattern provided on the second ear tip and configured to short-circuit the electrodes when the second ear tip is coupled to the main body, wherein the one or more computer programs include computer-executable instructions that, when executed by the one or more processors individually or collectively, cause the electronic device to identify that the second ear tip is coupled to the main body based on the short-circuit of the electrodes.

17. The electronic device of claim 14, further comprising:

at least one optical sensor disposed on the main body; and an optical pattern provided on the second ear tip and configured to be disposed to correspond to the at least one optical sensor when the second ear tip is coupled to the main body, wherein the one or more computer programs include computer-executable instructions that, when executed by the one or more processors individually or collectively, cause the electronic device to:

detect the optical pattern by using the at least one optical sensor, and identify that the second ear tip is coupled to the main body when the optical pattern is detected.

18. The electronic device of claim 14, further comprising:

a magnetic sensor disposed on the main body; and a magnet provided on the second ear tip and configured to be disposed to correspond to the magnetic sensor when the second ear tip is coupled to the main body, wherein the one or more computer programs include computer-executable instructions that, when executed by the one or more processors individually or collectively, cause the electronic device to:

detect the magnet using by using the magnetic sensor, and identify that the second ear tip is coupled to the main body when the magnet is detected.

19. The electronic device of claim 14, further comprising:

a microphone unit configured to receive at least a part of sound output from the speaker unit; and wherein the one or more computer programs include computer-executable instructions that, when executed by the one or more processors individually or collectively, cause the electronic device to identify an ear tip coupled to the main body from among the first ear tip and the second ear tip based on the sound received from the microphone unit.

* * * * *